J. H. WRIGHT.
VULCANIZING DEVICE.
APPLICATION FILED NOV. 27, 1915.
1,298,620.
Patented Mar. 25, 1919.
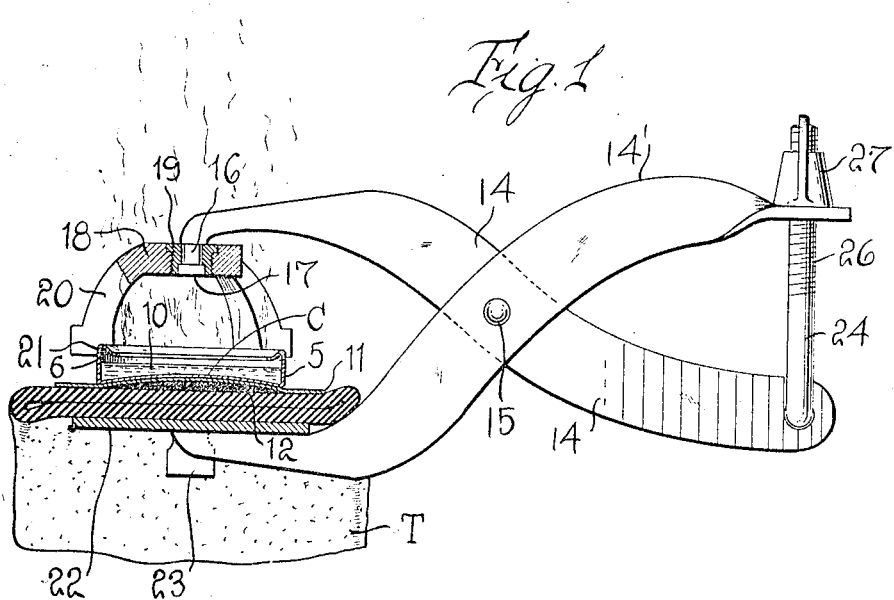
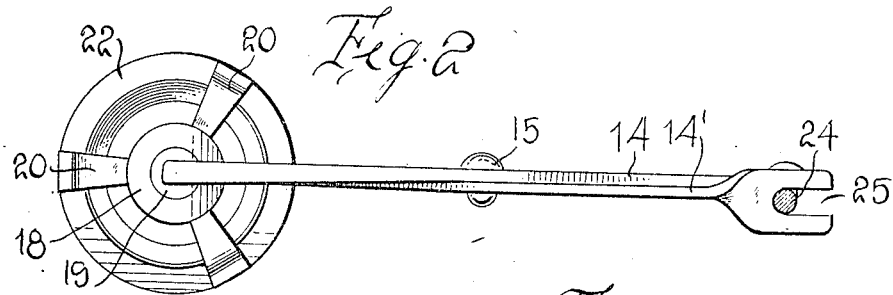
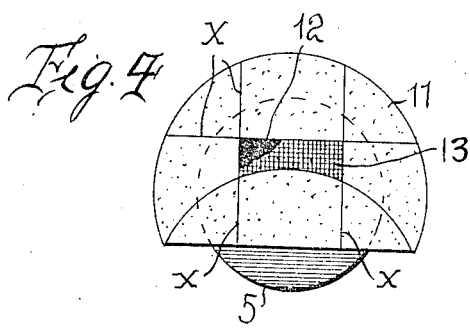
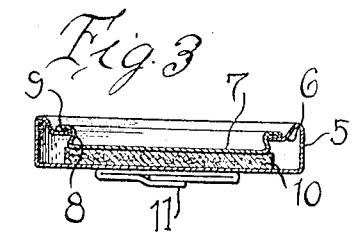
Inventor
JAMES. H. WRIGHT
By Watson E. Coleman
Attorney

UNITED STATES PATENT OFFICE.

JAMES H. WRIGHT, OF LEBANON, MISSOURI.

VULCANIZING DEVICE.

1,298,620.  Specification of Letters Patent.  Patented Mar. 25, 1919.

Application filed November 27, 1915. Serial No. 63,802.

*To all whom it may concern:*

Be it known that I, JAMES H. WRIGHT, a citizen of the United States, residing at Lebanon, in the county of Laclede and State of Missouri, have invented certain new and useful Improvements in Vulcanizing Devices, of which the following is a specification, reference being had to the accompanying drawings.

This invention relates to an improved vulcanizing device and has for its primary object to provide simple, reliable and effective means whereby a patch may be very easily and quickly vulcanized upon a punctured tire tube.

The invention has for another important object to provide novel means for quickly and properly applying the patch in position and then heating the same to cause said patch to vulcanize with the rubber tire tube.

The invention has for a further object to provide as an improved article of manufacture, a fuel container, to the bottom surface of which the patch to be applied to the tire is attached.

The invention has for still another object to provide means for clamping the fuel container and patch in position upon the tube, said fuel container being so constructed as to direct the flames away from the outer circumferential wall thereof to which the pressure is applied, and protecting means extending outwardly upon the tire tube from the wall of the fuel container to afford a protection for the tube.

With the above and other objects in view, my invention consists in the novel features of construction, combination and arrangement of parts to be hereinafter more fully described, claimed and illustrated in the accompanying drawing, in which, Figure 1 is a side elevation, the fuel container, tire tube, and portions of the clamping device being shown in section;

Fig. 2 is a top plan view of the clamping device;

Fig. 3 is an enlarged detail section of the fuel container, showing the inflammable disk or wafer therein and the closure cap applied; and Fig. 4 is a bottom plan view of the fuel container, with the patch applied thereto and the protecting sheet partly unfolded or opened.

The present invention is devised with a view to providing means for enabling a repair patch to be easily and quickly applied in cases of emergency to the inner tube of a pneumatic tire, and in accomplishing this desirable result, I have aimed to eliminate the necessity of employing the usual cast metal heating chamber and substitute therefor a simple and inexpensive fuel containing receptacle to one wall of which the patch is applied, and marketed and sold thus attached as a single commercial article. The fuel container, after being used, is discarded or thrown away and not subsequently employed in future vulcanizing operations.

The second primary feature of the invention resides in the provision of a simple, durable and effective clamping device, whereby the fuel container and the patch may be securely or tightly held in applied position upon the tire tube. Having thus generically set forth the primary elements of the invention, I will now proceed to relate the several structural features thereof whereby they mutually serve to satisfactorily perform their several functions in the accomplishment of the desired ultimate result.

Referring now more particularly to Figs. 3 and 4 of the drawing wherein I have illustrated the preferred form and construction of the fuel container, there is shown the container proper indicated at 5, which is in the form of a shallow sheet metal can or cup, preferably of cylindrical form. At the upper or open side of this cup, the marginal circumscribing wall thereof is provided with an inwardly and downwardly extending flange 6. 7 designates the closure cap for the container which is formed with a marginal flange 8 having an outwardly projecting lateral rim 9 which is adapted to seat upon the flange 6 of the body of the container. When this closure cap is in place as shown in Fig. 3, a substantially air-tight seal is produced. Within the container, a fuel wafer or disk 10 is disposed. This wafer may consist of wax or other similar substance which will melt under the application of heat, the said substance being impregnated with wood alcohol or similar inflammable liquid fuel.

To the under side of the bottom wall of the container 5, a sheet of waxed or oiled paper 11 is adhesively secured, and to the central portion of this paper sheet, the patch of rubber or other vulcanizable material indicated at 12 is secured in like manner. The patch is covered and protected from the deleterious effects of moisture by a cloth or linen sheet 13. The portions of the paper sheet 11 which project beyond the marginal edges of the patch 12 are adapted to be folded along the lines indicated at $x$ so that the patch and the linen sheet 13 are entirely covered by the folded oiled sheet of paper, no portion of said folded sheet projecting beyond the outer circular wall of the container 5. Thus, the patch is very compactly arranged upon the wall of the container together with the cover and protecting sheet therefor. The fuel containers with the two patches thus attached, are commercially marketed and sold for use by the individual motor vehicle owner.

The second essential feature of the invention resides, as above stated, in the provision of a special clamping device for retaining the fuel container and the attached patch in proper applied position upon the tire tube. This clamping device consists of the crossed or intersecting bars 14 and 14' pivotally connected to each other, as at 15. The bar 14 is provided upon one of its ends with an angularly disposed, cylindrical stud 16 projecting inwardly toward the other of the bars and terminating in an enlarged head 17. Upon the stud 16, the clamping head 18 is loosely mounted, preferably by providing the bushing 19 centrally threaded in said head and having an internal shoulder resting upon the enlarged head 17 of the stud 16. The clamping head 18 is formed with a plurality of outwardly projecting, curved arms 20, preferably three in number. The outer end of each of the arms 20 has a shoulder 21 formed in its end face.

The other bar 14' of the clamping device is provided upon the end thereof which is opposed to the stud 16 on the other of the arms, with a circular plate or disk 22 upon the edge of which angularly disposed lugs or fingers 23 are formed at diametrically opposite points.

To the other end of the bar 14, one end of a rod 24 is loosely connected, and the corresponding end of the bar 14' is provided with an open-ended slot 25 to receive the threaded section 26 of the rod 24. A wing nut 27 is threaded upon said rod for engagement against the end of the bar 14'. By adjusting this wing nut, it will be readily understood that the opposite ends of the bars containing the clamping head and the disk 22 may be forced toward each other.

Upon reference to Fig. 1 of the drawing, the manner of application and use of the invention will be clearly and fully understood. When it is desired to repair the puncture in the inner tube of the tire indicated at T, the oiled or waxed paper sheet 11 is first unfolded or opened and the protecting cover of linen 13 on the patch is removed. The closure cap 7 is then removed from the fuel container and said container arranged upon the tire tube with the patch 12 directly over the puncture therein. The clamping device is now arranged in position with the shoulders 21 on the arms 20 abutting against the outer wall of the container 5 and said arms extending over the edge of said wall and upon the same while the clamping plate or disk 22 is engaged upon the other side of the tire tube. It will be observed that the oiled paper sheet 11, when unfolded, is of greater diameter than the container 5 so that it will extend outwardly beyond the same and rest upon the wall of the tire tube. The nut 27 is now adjusted so as to force the opposite ends of the bars 14 and 14' toward each other and thus cause the clamping arms 20 to exert a pressure upon the edge of the fuel container and securely clamp the same in place. As before stated, this container is formed of sheet metal, and when the pressure is thus applied to the marginal wall thereof, the bottom wall to which the patch 12 is attached will assume a convex form or curvature, as indicated at C in Fig. 1. The inflammable disk or wafer 10 is now ignited by applying a match thereto so that the wall C will be rapidly heated, thus softening and vulcanizing the patched disk to such an extent as to cause the same to fuse or unite with the rubber of the tire tube. This patch will, of course, have an outer face of the same convex curvature as the wall C so that the tube will fit snugly against the inner wall of the tire casing. Now it is desirable to avoid heating of the rubber tube beyond the marginal edges of the patch, for the obvious reason that the pressure exerted by the clamping device upon the fuel container will be transmitted almost entirely at the outer marginal wall of the container to the tube and will be very likely to greatly weaken the tube. I have provided means for obviating the heating of the surrounding tire tube and the possibility of thus mutilating or distorting the same. The oiled or waxed paper sheet 11 disposed between the patch and the bottom wall of the container, extends outwardly beyond the vertical container wall and upon the surface of the tube. It will thus be seen that very little heat will radiate outwardly from the wall of the container, and by providing the protecting sheet of oiled paper, the surface of the tube immediately contiguous to the patch cannot be reduced to such consistency that the pressure upon the vertical wall of the container would in any way mutilate or distort the wall of the tube.

From the foregoing description, taken in connection with the accompanying drawing, the construction, manner of use and several advantages of my invention will be clearly and fully understood. It will be seen that I have provided a vulcanizing device which may be marketed and sold at small initial cost, and as the fuel containers carrying the wax disks are of cheap and simple construction, they may be subsequently purchased by the individual vehicle owner at a nominal price. Thus, the invention enables the automobilist to quickly and successfully vulcanize a patch upon a punctured tire tube in cases of emergency, and without resorting to the employment of a skilled repairman and suffering the inconveniences and delays incident to such a necessity. Particular attention is invited to the fact that the adjusting and clamping means for the jaws of the patch applying tool is located at a remote point from the fuel container so that the nut 27 will not be highly heated, in which case the user would have to patiently wait until the nut cooled so as to enable him to release and remove the clamping tool. It is, therefore, manifest that the device may be instantly removed after the patch has been heated for the requisite length of time so as to effect its unification with the wall of the tire tube. After the patch has thus been applied, the container 5 and the protecting or cover sheet 11 are removed and thrown away. Now, while I have shown and described the preferred form and construction of the fuel container and patch clamping device and believe that the same will be found best adapted for the intended purpose, it is, nevertheless, within the purview of my invention to utilize various other clamping means than that disclosed, for it will be understood that the invention resides more in the utilization and adaptation of such a clamping device to the particular means which I have devised for quickly and conveniently vulcanizing the patch to the tube, than it does in any specific structural features of the clamp. Consequently, I reserve the privilege of employing any type of clamping device which might be successfully used in connection with the fuel container, and to also modify the construction of said container and the manner of attaching the patch thereto in all legitimate respects which may fairly fall within the spirit and scope of the invention as claimed.

Having thus fully described my invention, what I desire to claim and secure by Letters Patent is:—

1. In a tire tube repair device, a shallow fuel container having a bendable bottom, a flange projecting inwardly from the upper portion of the wall of said container, a closure for the top of said container, which closure engages the inwardly projecting flange, a sheet of flexible material applied to the bottom of said container, which sheet is substantially larger than the area of the bottom of the container so that its edges project beyond the wall of the container, a repair patch applied to the underside of the flexible sheet, and a protecting sheet covering the repair patch.

2. In a tire tube repair device, a shallow fuel container having a bendable bottom, a flange projecting inwardly from the upper portion of the wall of said container, a closure for the top of said container, which closure engages the inwardly projecting flange, a sheet of flexible material applied to the bottom of said container, which sheet is substantially larger than the area of the bottom of the container so that its edges project beyond the wall of the container, a repair patch applied to the underside of the flexible sheet, a protecting sheet covering the repair patch, and means for applying pressure to the outer wall of the container to hold the same and the patch in place while being applied to a tube to cause the bottom wall of said container to assume a concavo-convex form.

3. In a tire tube repair device, a shallow fuel container having a bendable bottom wall and an annular side wall, a flange projecting inwardly from the upper portion of said side wall, a closure for the top of said container, which closure occupies the opening within the inwardly projecting flange, a flexible sheet applied to the underside of said container, a repair patch applied to the underside of said flexible sheet, a protecting member removably applied to the underside of the repair patch, and the first mentioned flexible sheet being substantially larger in area than the repair patch and the protecting member thereof whereby the projecting edges of said flexible sheet may be folded over each other so as to wholly inclose the repair patch and protecting covering therefor.

4. In a tire tube repair device, a shallow fuel container having a bendable bottom wall and an annular side wall, a flange projecting inwardly from the upper portion of said side wall, a closure for the top of said container, which closure occupies the opening within the inwardly projecting flange, a flexible sheet applied to the underside of said container, a repair patch applied to the underside of said flexible sheet, a protecting member removably applied to the underside of the repair patch, the first mentioned flexible sheet being substantially larger in area than the repair patch and the projecting member thereof whereby the projecting edges of said flexible sheet may be folded over each other so as to wholly inclose the repair patch and protecting covering therefor, and means for exerting clamping pressure upon the wall of the container to hold the same and the patch in place upon the tube and cause the bottom wall of the container to assume a concavo-convex shape.

5. In a device of the class described, a container having a bendable bottom and an annular side wall, a flange projecting inwardly from the upper portion of said side wall, said container being adapted to receive and hold combustible material, a closure for the top of the container, the edge of which closure bears on the flange projecting inwardly from the wall of said container, and a vulcanizable tire tube patch detachably carried upon the underside of said container.

6. In a device of the class described, a container having a bendable bottom and an annular side wall, a flange projecting inwardly from the upper portion of said side wall, said container being adapted to receive and hold combustible material, a closure for the top of the container, the edge of which closure bears on the flange projecting inwardly from the wall of said container, a vulcanizable tire tube patch detachably carried upon the underside of said container, and a flexible sheet of material forming a protective covering for said tire tube patch.

In testimony whereof I hereunto affix my signature in the presence of two witnesses.

JAMES H. WRIGHT.

Witnesses:
W. C. MAYFIELD,
M. L. GEENSTREET.